(12) United States Patent
Biederman et al.

(10) Patent No.: US 12,164,313 B2
(45) Date of Patent: Dec. 10, 2024

(54) VISCOSITY CONTROL SYSTEM AND METHOD

(71) Applicant: HITCHINER MANUFACTURING CO., INC., Milford, NH (US)

(72) Inventors: Scott Biederman, Milford, NH (US); Thomas Bonaventura, Milford, NH (US)

(73) Assignee: Hitchiner Manufacturing Co., Inc., Milford, NH (US)

( * ) Notice: Subject to any disclaimer, the term of this patent is extended or adjusted under 35 U.S.C. 154(b) by 239 days.

(21) Appl. No.: 17/830,867

(22) Filed: Jun. 2, 2022

(65) Prior Publication Data

US 2023/0393594 A1    Dec. 7, 2023

(51) Int. Cl.
*G01N 11/02* (2006.01)
*G05D 11/13* (2006.01)
*G01N 11/00* (2006.01)

(52) U.S. Cl.
CPC ............. *G05D 11/13* (2013.01); *G01N 11/02* (2013.01); *G01N 2011/0046* (2013.01)

(58) Field of Classification Search
CPC .................. G05D 11/13; G01N 11/02; G01N 2011/0046; G01N 11/06; G01N 11/04; G01N 2291/02828
USPC ........... 73/54.01, 54.02, 54.07, 54.08, 54.11, 73/54.13, 54.14, 54.43
See application file for complete search history.

(56) References Cited

U.S. PATENT DOCUMENTS

2012/0327145 A1* 12/2012 Pouzet ..................... B41J 2/185
347/7

FOREIGN PATENT DOCUMENTS

CN          111624138 A     9/2020
WO     WO 2007/125555 A1   11/2007

OTHER PUBLICATIONS

European Patent Application No. 23176329.3; Extended Search Report; dated Oct. 10, 2023; 9 pages.

* cited by examiner

*Primary Examiner* — Robert R Raevis
(74) *Attorney, Agent, or Firm* — BakerHostetler

(57) ABSTRACT

A viscosity control system for measuring and controlling a viscosity of a viscous fluid includes a viscosity sensor unit, a supply of viscosity adjusting fluid, and a controller. The viscosity sensor unit includes a container having an inlet and an outlet, a flow of the viscous fluid flowing into the inlet, and a sensor configured to sense a height of a surface of the viscous fluid in the container. A diameter of the outlet and the flow of the viscous fluid are configured to generate a height of the viscous fluid in the container that is within a predetermined height range. The controller is configured to receive the sensed height, compare the sensed height to the predetermined height range, and modulate a flow of fluid from the supply of viscosity adjusting fluid in response to the sensed height being outside the predetermined height range.

19 Claims, 4 Drawing Sheets

VISCOSITY CONTROL SYSTEM AND METHOD

FIELD OF THE INVENTION

The present invention generally relates to measurement and control of viscosity. More particularly, the present invention pertains to a system and method of measuring and controlling the viscosity of a slurry, emulsion, gel, and other viscous fluids.

BACKGROUND OF THE INVENTION

It is generally accepted that in many manufacturing and industrial settings, it is important to know and control the viscosity of fluids. For fluids with low viscosity and/or without suspended solids or emulsions, conventional viscometers are readily available. These conventional automated viscometers utilize rotation of a paddle wheel or vibration of a film to determine viscosity. However, more viscous fluids and, particularly, slurries, may be unsuitable for these conventional viscometers. Instead, viscometers such as the Zahn cup and the like are manually dipped into the slurry, withdrawn, and the time it takes for the slurry to drain from a hole in the Zahn cup is used to determine the viscosity. Unfortunately, this is a slow process. For example, it may take a minute or more for each measurement. If multiple corrections are made to the viscosity of a slurry and the viscosity is measured in this manual manner between each correction, the delays can be time-consuming and costly.

Accordingly, it is desirable to provide a method and apparatus capable of overcoming the disadvantages described herein at least to some extent.

SUMMARY OF THE INVENTION

The foregoing needs are met, to a great extent, by the present invention, wherein in some respects a system, apparatus and method is provided that in some embodiments overcomes the issues described, at least to some extent.

An embodiment of the present invention pertains to a viscosity control system for controlling a viscosity of a viscous fluid. The viscosity control system includes a viscosity sensor unit, supplies of viscosity adjusting fluids, and a controller. The viscosity sensor unit includes a container having an inlet and an outlet, a flow of the viscous fluid flowing into the inlet, and a sensor configured to sense a height of a surface of the viscous fluid in the container. A diameter of the outlet and the flow of the viscous fluid are configured to generate a height of the viscous fluid in the container that is within a predetermined height range. The controller is configured to receive the sensed height, compare the sensed height to the predetermined height range, and modulate a flow of fluid from the supply of viscosity adjusting fluid(s) in response to the sensed height being outside the predetermined height range.

Another embodiment of the present invention pertains to a method of controlling a viscosity of a viscous fluid. In this method, a flow of the viscous fluid is provided into a container. The container has an inlet and an outlet. The outlet has a diameter configured to provide an outflow that equilibrates with the flow of the viscous fluid into the container at a predetermined height range in response to the viscosity of the viscous fluid being at a predetermined viscosity. A height of a surface of the viscous fluid in the container is sensed with a sensor. The sensed height of the surface of the viscous fluid in the container is compared to the predetermined height range with a controller. The viscosity of the viscous fluid is modulated in response to the sensed height of the surface of the viscous fluid in the container being outside the predetermined height range with the controller.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1:
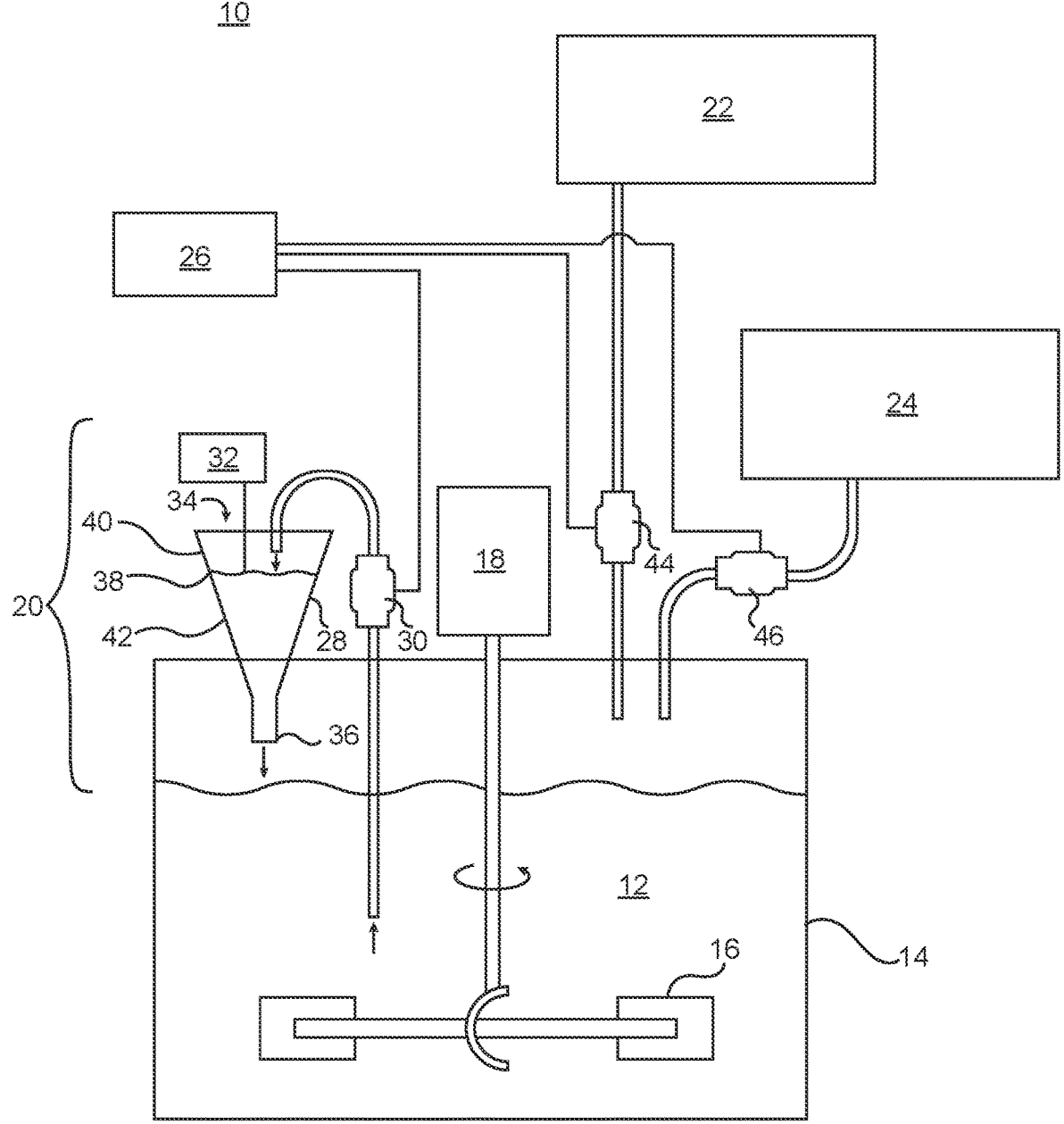
FIG. 1 is a system architecture for a viscosity control system according to an embodiment of the invention.

The present invention provides a viscosity control system and method. In some embodiments, the invention provides viscosity control of a slurry by sensing the viscosity of the slurry with a viscosity sensor unit and modulating the viscosity in response to the sensed viscosity being outside a predetermined viscosity or predetermined viscosity range. While the viscosity of some fluids may be continuously measured with some accuracy using conventional viscosity sensors, the properties of slurries, emulsions, gels, and other viscous fluids make it difficult to continuously or automatically determine the viscosity. Examples of slurries include: ceramic powders suspended in water for coating or casting; suspended medicaments for use in pharmaceuticals; cementitious suspensions used as a building material; paints, varnishes, inks, dyes and other coatings with suspended pigments and coating particles; bitumen or tar sands suspended in detergent solutions to remove the petrochemicals from the sand; drilling fluids; asphalt; and the like. Examples of emulsions and gels include: epoxy and other resin solutions; detergents; adhesives; cosmetics, lotions, milk and other dairy products; other foods such as soups, mayonnaise, ketchup, foods with agar and carrageenan, jellies, jams, and the like.

A difficulty when measuring the viscosity of a slurry includes the property that slurries are continuously agitated or stirred to retain the suspended solids in the slurry. These suspended particles are incompatible with conventional viscosity sensors due to the abrasive nature and/or vibration dampening nature of the particles. Instead, a dip cup is manually used to determine viscosity by dipping the cup into the slurry, withdrawing the cup that has an outlet, and counting the time it takes the slurry to drain, or mostly drain, from the outlet. It is an advantage of embodiments of the present invention that the viscosity sensor unit overcomes the disadvantages of conventional viscometers.

According to various embodiments, the viscosity of the slurry may be modulated in response to the sensed viscosity of the slurry. For example, in response to the viscosity of the slurry being higher than the predetermined viscosity, a lower viscosity fluid may be added to the slurry. The lower viscosity fluid may be a diluent or solvent, such as water, alcohol, acetone, methyl ethyl ketone (MEK), or the like. In other examples, the lower viscosity fluid may be a slurry that is less viscous than the slurry. Alternatively, in response to the viscosity of the slurry being lower than the predetermined viscosity, a higher viscosity fluid may be added to the slurry. For example, a higher viscosity slurry may be added. In another example, a powder may be added to the slurry to raise the viscosity of the slurry. In yet another example, viscosity may be increased by raising the rate of evaporation via increasing airflow, temperature, etc.

The viscosity control system further includes a controller to control or modulate a flow of less viscous and/or more viscous fluid into the slurry based on the sensed viscosity of the slurry. In this manner, the viscosity of the slurry may be controlled. The controller is configured to modulate these flows via modulation of one or more pumps, solenoid valves, or the like. Moreover, the controller is configured to receive signals from a sensor of the viscosity sensor unit, determine if the viscosity is above/below the predetermined viscosity value or range, and then modulate the pumps/valves to return the sensed viscosity back to the predetermined viscosity value or range. In some embodiments, the controller may include a proportional-integral-derivative (PID) control loop mechanism employing feedback to continuously modulate control in order to obtain the predetermined viscosity or range. The predetermined viscosity value or range may be empirically determined or provided by the manufacturer of the slurry solids.

Another embodiment in accordance with the present invention provides a method of controlling viscosity in a viscous fluid such as a slurry, emulsion, and gel. In some examples of this method, the viscous fluid may be generated by mixing components together and the viscosity control system may be configured to modulate the viscosity until the predetermined viscosity is achieved. In other embodiments of this method, the viscosity control system may be configured to maintain the predetermined viscosity of the viscous fluid indefinitely.

Advantages of various embodiments of the invention include, for example: (1) increasing workflow because viscous fluid is maintained at predetermined viscosity; (2) decreasing worker-hours dedicated to monitoring viscosity; (3) increasing reliability because viscosity is continuously maintained; and (4) decrease of production costs because workflow is increased and worker-hours for viscosity maintenance can be shifted to increase production.

Embodiments of the invention will now be described with reference to the drawing figures, in which like reference numerals refer to like parts throughout. As shown in FIG. 1, a viscosity control system 10 is configured to control the viscosity of a viscous fluid 12 in a tank 14. The viscous fluid may include a slurry, emulsion, gel or the like. The tank 14 may include an impeller 16 spun by a motor 18. The viscosity control system 10 may include a viscosity sensor unit 20, a low viscosity fluid supply 22, a high viscosity supply 24, and a controller 26. The viscosity sensor unit 20 may include a container 28, a pump 30, and a sensor 32. The container 28 includes an inlet 34 and an outlet 36. The container 28 is configured to receive a flow of the viscous fluid 12 from the pump 30 and a flow of the viscous fluid 12 is configured to flow out of the outlet 36 and returned to the tank 14. To facilitate the flow of the viscous fluid 12 through the container 28, the shape of the container 28 may be a funnel, for example.

Without being bound to any specific scientific principle, Bernoulli's equation can be used to calculate the flow through the outlet 36, however, it neglects the effect of viscosity on fluid flow or the time to empty the container 28. If we consider an example with an outlet in the side of the container 28 (not shown), the flow rate of fluid out of the container 28, Q, can be described as:

$$Q = C_d A \sqrt{2gH} \qquad \text{EQ \#1}$$

Where: Q is the flow rate of the viscous fluid 12 out of the outlet 28; $C_d$=discharge coefficient; A=cross-sectional area of the outlet 28; g=acceleration of gravity; and H=head height above the centerline of the outlet 28. This equation is true where the head pressure remains constant. The viscosity of the viscous fluid 12 has an impact on the discharge coefficient which is described as:

$$C_d = \frac{d\sqrt{gH}}{v} \qquad \text{EQ\#2}$$

Where: d=diameter of the outlet 28; g=acceleration of gravity; and H=head height above the centerline of the outlet 28; and v=kinematic viscosity of the fluid. Maintaining a constant head height of H and substituting the discharge coefficient equation into the flow rate equation yields:

$$Q = \frac{\sqrt{2}\, dgHA}{v} \qquad \text{EQ\#3}$$

Where: Q is the flow rate of the viscous fluid 12 out of the outlet 28; v=kinematic viscosity of the fluid; A=cross-sectional area of the outlet 28; g=acceleration of gravity; and H=head height above the centerline of the outlet 28. Maintaining a constant head height of H and substituting the discharge coefficient equation into the flow rate equation yields:

$$v = \frac{\sqrt{2}\, dgHA}{Q} \qquad \text{EQ\#4}$$

Where: v=kinematic viscosity of the fluid; Q is the flow rate of the viscous fluid 12 out of the outlet 28; A=cross-sectional area of the outlet 28; g=acceleration of gravity; and H=head height above the centerline of the outlet 28. In this manner, measuring the volumetric flow rate then allow calculation of the kinematic viscosity which may be converted to dynamic viscosity, if needed, by measuring the density of the viscous fluid 12. In some embodiments, a predetermined flow rate of the viscous fluid 12 may replace the predetermined viscosity because the flow rate may be an important parameter in coating molds, for example.

To continue, the sensor 32 may include any suitable sensor for sensing a height of the viscous fluid 12 in the container 28. Examples of suitable sensors may include a laser distance sensor, float sensor, or the like. In a particular example, the sensor 32 is a laser distance sensor that is disposed in cooperative alignment above the container 28. In response to knowing a distance from the outlet 36 to the sensor 32 and determining the distance from the sensor 32 to the top of the viscous fluid 12 in the container 28, an absolute height of the viscous fluid 12 in the container 28 can be calculated. The sensor 32 is further configured to send signals to the controller 26. These signals may include the sensed distance and/or the calculated height of the viscous fluid 12 in the container 28. The controller 26, in turn, compares the sensed height of the viscous fluid 12 in the container 28 to a predetermined height range 38 that corresponds to the predetermined viscosity based on the calculation of Equation #4.

The pump 30 is configured to draw the viscous fluid 12 from the tank 14 and supply the viscous fluid 12 to the inlet 34 at a controlled flow rate. In a particular example, the pump 30 is a peristaltic pump. The flow rate of the pump 30 may be modulated by the controller 26. For example, the pump 30 may include a variable frequency drive (VFD) and the controller 26 may be configured to modulate the frequency of the VFD so that the viscous fluid 12 does not spill over the top of the container 28 and/or so that the container 28 does not empty. In this regard, in response to the controller 26 determining the sensed height of the viscous fluid 12 exceeds a predetermined maximum height 40, the controller 26 may be configured to modulate the VFD of the pump 30 to decrease the flow of the viscous fluid 12 therethrough. Conversely, in response to the controller 26 determining the sensed height of the viscous fluid 12 has fallen below a predetermined minimum height 42, the controller 26 may be configured to modulate the VFD of the pump 30 to increase the flow of the viscous fluid 12 therethrough. In response to the sensed height of the viscous fluid 12 being between the predetermined maximum height 40 and the predetermined minimum height 42, the controller 26 may be configured to modulate the VFD of the pump 30 to return to a normal flow rate of the viscous fluid 12 therethrough.

In other embodiments, the pump 30 may be omitted or disposed after the container 28. For example, the tank 14 may include an outlet disposed at or near the bottom of the tank 14 with a controllable valve. The container 28 may be disposed in cooperative alignment with the controllable valve and the viscosity sensor unit 20 may, otherwise, function as described herein.

The low viscosity fluid supply 22 and/or the high viscosity supply 24 may include respective pumps 44 and 46. Alternatively, the pumps 44 and 46 may be solenoid valves or other such devices for controlling a flow therethrough. The pumps 44 and 46 are each, independently, controllable by the controller 26. For example, in response to the controller 26 determining that the sensed viscosity of the viscous fluid 12 exceeds the predetermined viscosity, the controller 26 is configured to send a signal to the pump 44. In response to these signals, the pump 44 is configured to modulate a flow of fluid from the low viscosity fluid supply 22. In various embodiments, a rate of flow from the low viscosity fluid supply 22 may be modulated and/or a predetermined flow rate may be initiated and stopped in response to the signals from the controller 26.

Figure 2:
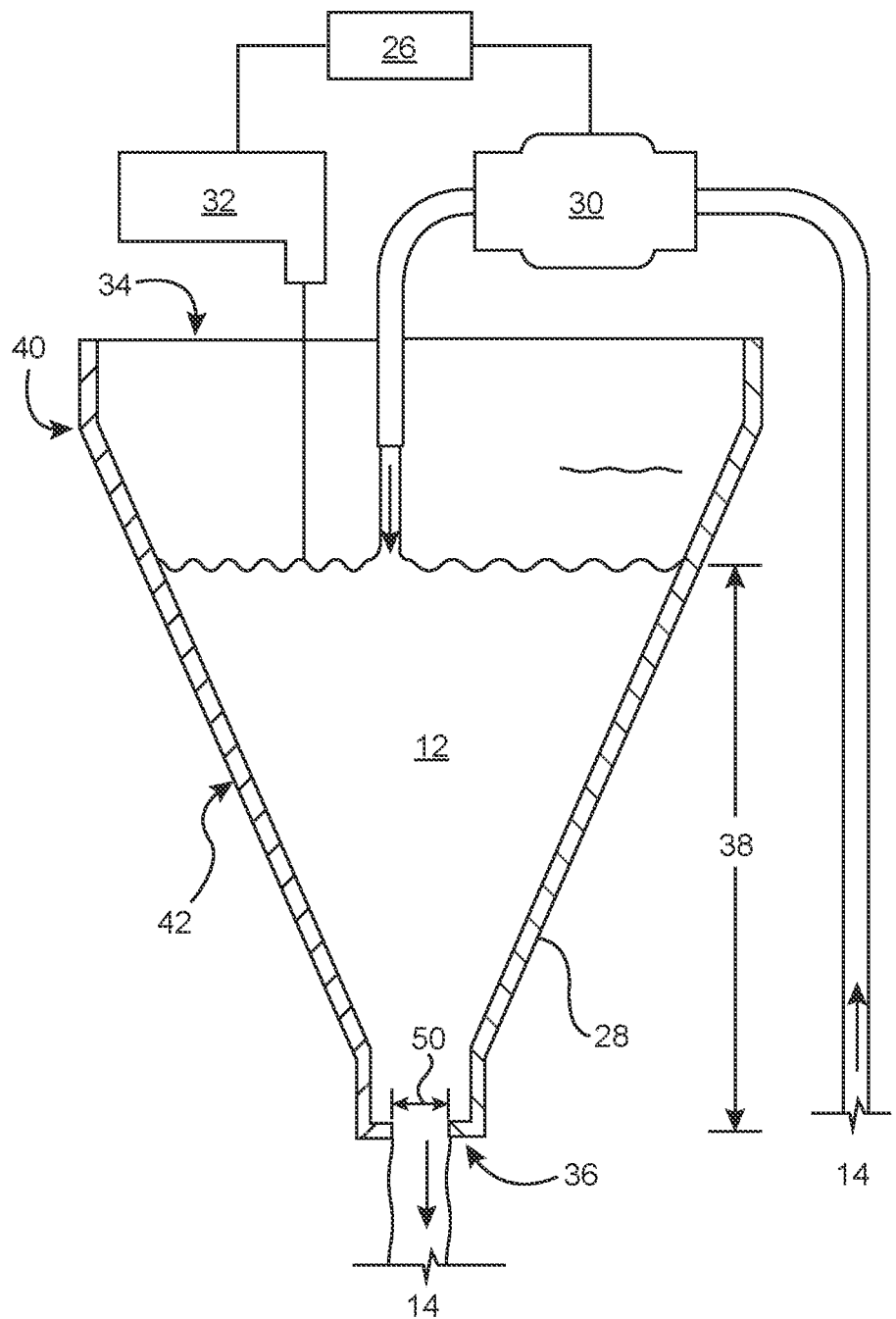
FIG. 2 is a diagram of a viscosity sensor unit according to an embodiment of the invention.

FIG. 2 is a diagram of the viscosity sensor unit 20 according to an embodiment of the invention. As shown in FIG. 2, the container 28 is supplied with a flow of the viscous fluid 12 via the pump 30. The pump 30 supplies the viscous fluid at a rate that is determined to match an outflow from the outlet 36 at the predetermined viscosity. In response to these rates being the same, a fill level of the viscous fluid 12 in the container 28 will equilibrate at the predetermined height range 38. In this regard, a diameter (d) 50 of the outlet 36 is configured to provide an outflow rate at the predetermined viscosity that will result in a predetermined height range 38 that is suitable for the size of the container 28.

As described herein, the viscosity of the viscous fluid 12 may be modulated in response to the sensed viscosity of the viscous fluid 12. For example, in response to the viscosity of the viscous fluid 12 being higher than the predetermined viscosity, the lower viscosity fluid may be added to the viscous fluid 12 via modulation of the pump 44. The lower viscosity fluid may be a diluent or solvent, such as water, alcohol, acetone, MEK, or the like. In a particular example, the lower viscosity fluid is water. In another particular example, the lower viscosity fluid may be a slurry that is less viscous than the viscous fluid 12. Alternatively, in response to the viscosity of the viscous fluid 12 being lower than the predetermined viscosity, a higher viscosity fluid from the high viscosity supply 24 may be added to the viscous fluid 12 via modulation of the pump 46. For example, a higher viscosity formulation of the viscous fluid 12 may be added. In another example, a powder may be added to the viscous fluid 12 to raise the viscosity of the viscous fluid 12. In yet another example, viscosity may be increased by raising the rate of evaporation via increasing airflow, temperature, etc.

In response to the height of the viscous fluid 12 in the container 28 exceeding the predetermined maximum 40 or below the predetermined minimum, the flow rate of the viscous fluid 12 into the container 28 may be modulated. For example, the controller 26 may be configured to modulate the frequency of the VFD so that the viscous fluid 12 does not spill over the top of the container 28 and/or so that the container 28 does not empty. In this regard, in response to the controller 26 determining the sensed height of the viscous fluid 12 exceeds the predetermined maximum height 40, the controller 26 may be configured to modulate the VFD of the pump 30 to decrease the flow of the viscous fluid 12 therethrough. Conversely, in response to the controller 26 determining the sensed height of the viscous fluid 12 has fallen below the predetermined minimum height 42, the controller 26 may be configured to modulate the VFD of the pump 30 to increase the flow of the viscous fluid 12 therethrough. In response to the sensed height of the viscous fluid 12 being between the predetermined maximum height and the predetermined minimum height 42, the controller 26 may be configured to modulate the VFD of the pump 30 to return to a normal flow rate of the viscous fluid 12 therethrough.

Figure 3:
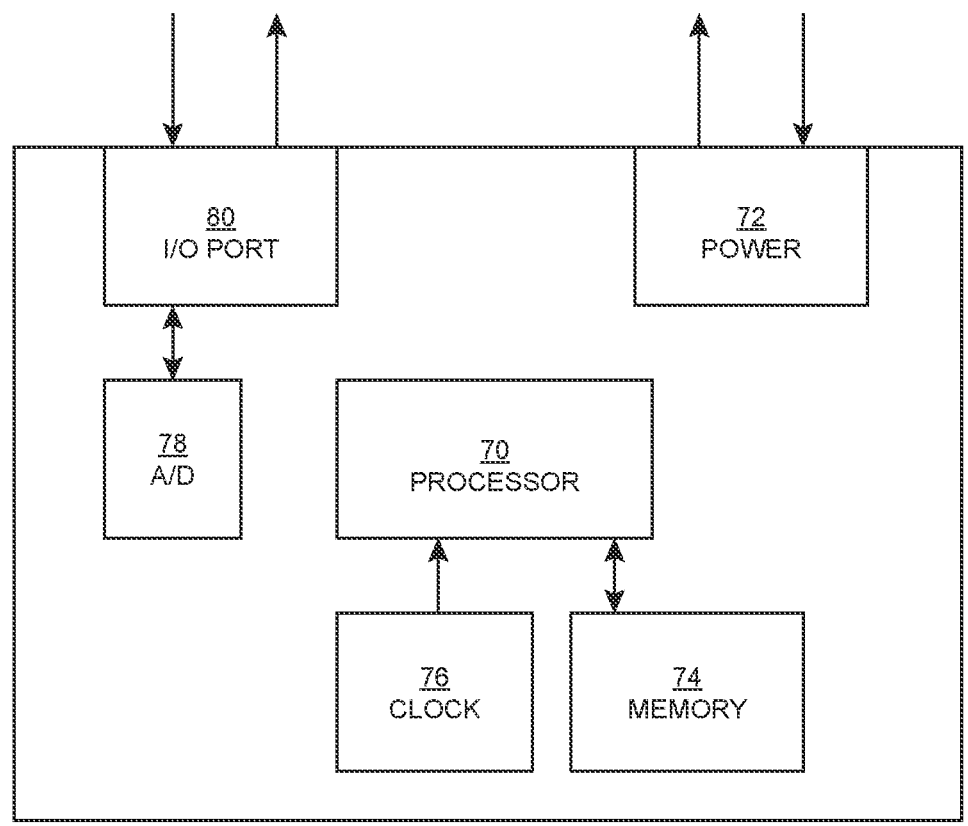
FIG. 3 is a system architecture for a controller suitable for use in the system according to FIG. 1.
Figure 4:
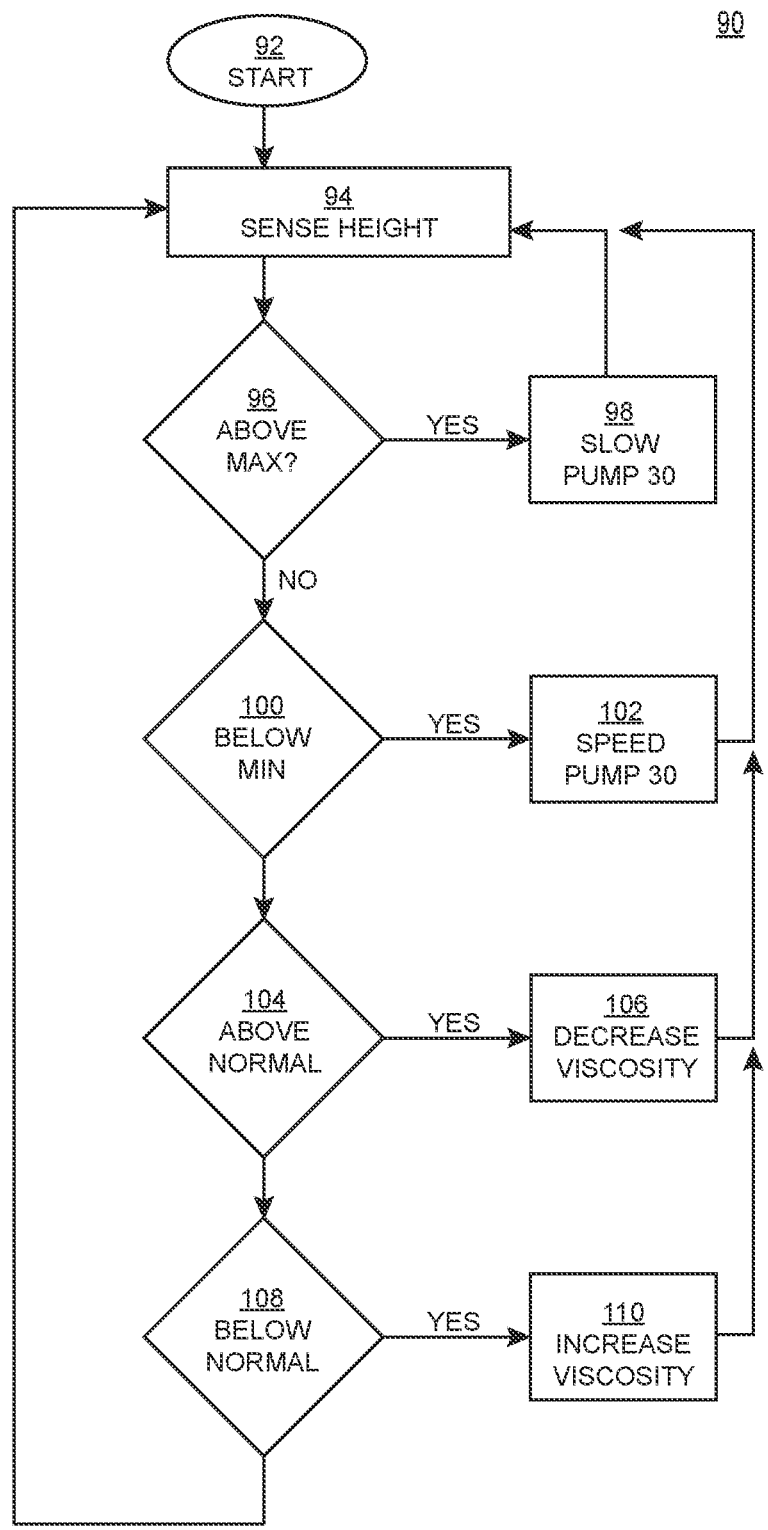
FIG. 4 is a flow diagram according to an embodiment of the invention.

FIG. 3 is a system architecture for the controller 26 suitable for use in the viscosity control system 10 according to FIG. 1. As shown in FIG. 4, the controller 26 includes a processor 70. This processor 70 is operably connected to a power supply 72, memory 74, clock 76, analog to digital converter (A/D) 78, and an input/output (I/O) port The I/O port 80 is configured to receive signals from any suitably attached electronic device and forward these signals to the A/D 78 and/or the processor 70. For example, the I/O port 80 may receive signals associated with height sensed by the sensor 32 and forward the signals to the processor 70. If the signals are in analog format, the signals may proceed via the A/D 78. In this regard, the A/D 78 is configured to receive analog format signals and convert these signals into corresponding digital format signals. Conversely, the A/D 78 is configured to receive digital format signals from the processor convert these signals to analog format, and forward the analog signals to the I/O port In this manner, electronic devices configured to receive analog signals may intercommunicate with the processor 70.

The processor 70 is configured to receive and transmit signals to and from the A/D 78 and/or the I/O port 80. The processor 70 is further configured to receive time signals from the clock 76. In addition, the processor 70 is configured to store and retrieve electronic data to and from the memory 74. Furthermore, the processor 70 is configured to determine signals operable to modulate the pumps 30, 44, and 46 and thereby control the flow rates of these pumps 30, 44, and 46 independently. For example, signals associated with motor speed and/or starting/stopping the motor may be forwarded to the pump 44 by the processor 70 via the I/O port 80.

According to an embodiment of the invention, the processor 70 is configured to determine a sensed height of the viscous fluid 12 in the container 28 and compare this value to the predetermined height range 38. In addition, the processor 70 may be configured to determine a slope of the sensed height over time and the processor may utilize this slope to adjust a flow rate of correcting fluid such as the lower viscosity fluid from the low viscosity fluid supply 22 via modulation of the pump 44 or a higher viscosity agent from the high viscosity supply 24 via modulation of the pump 46. In this manner, the sensed height of the viscous fluid 12 in the container 28 may be configured to essentially match the predetermined height range 38.

According to another embodiment of the invention, the processor 70 is configured to determine whether the sensed height of the viscous fluid 12 exceeds the predetermined maximum height 40 or falls below the predetermined minimum height 42. In response, the processor 70 is configured to modulate flow into the container 28. For example, signals associated with motor speed may be forwarded to the VFD of the pump 30 by the processor 70 via the I/O port 80.

FIG. 4 is a flow diagram of a method 90 according to an embodiment of the invention. Of note, the following steps need not proceed in the order presented, but rather, may proceed in any suitable order. Furthermore, some or all of the steps may proceed simultaneously. Prior to initiation of the method 90, the tank 14 may be filled with the viscous fluid 14. As shown in FIG. 4, the method 90 is initiated in response to turning on the viscosity control system 10 at step 92 and sensing a height of the viscous fluid 12 in the container 28 at step 94. At step 96, an overflow state may be identified. For example, in response to the sensed height being greater than the predetermined maximum height 40, the controller 26 may signal the pump 30 to decrease the flow of the viscous fluid 12 into the container 28 at step 98. In this manner, overflow of the container 28 may be reduced or prevented while performing the method 90. In addition, an overflow count may be initiated and, if after a predetermined number of overflow states and successive pump flow reductions does not correct the overflow state, an error may be generated, a visual or auditory alert may be generated, and/or the pump 30 may be stopped.

At step 100 an underflow state may be identified. For example, in response to the sensed height being less than the predetermined minimum height 42, the controller 26 may signal the pump 30 to increase the flow of the viscous fluid 12 into the container 28 at step 102. In this manner, emptying of the container 28 may be reduced or prevented while performing the method 90. In addition, an underflow count may be initiated and, if after a predetermined number of underflow states and successive pump flow increases does not correct the underflow state, an error may be generated, a visual or auditory alert may be generated, and/or the pump 30 may be stopped.

At step 104, a high viscosity condition may be determined. For example, in response to the sensed height being greater than the predetermined height range 38, the controller 26 may be configured to modulate the pump 44 to initiate or increase the flow of the low viscosity fluid from the low viscosity fluid supply 22 at step 106. In some embodiments, the low viscosity fluid supply 22 may be a water supply line that supplies tap water, deionized water, distilled water, or the like. If so, the pump 44 may be replaced with a solenoid or other controllable valve.

At step 108, a low viscosity condition may be determined. For example, in response to the sensed height being less than the predetermined height range 38, the controller 26 may be configured to modulate the pump 46 to initiate or increase the flow of the higher viscosity agent from the high viscosity supply 24 at step 110. In some embodiments, the high viscosity supply 24 may be a higher viscosity formulation of the viscous fluid 12. In this regard, the high viscosity supply 24 may also include a respective viscosity control system 10 that is configured to maintain a comparatively higher viscosity. In another embodiment, the high viscosity supply 24 may include a powdered solid and the pump 46 is replaced with an auger or other such device to controllably add the powdered solid to the tank 14.

More generally, steps 104-110 describe a determination that the viscosity of the viscous fluid 12 is outside the predetermined viscosity, which corresponds to the predetermined height range 38. In some embodiments, the viscosity control system 10 may be configured to only adjust the viscosity of the viscous fluid 12 higher or lower. For example, if the viscous fluid 12 only experiences evaporative loss of water resulting in an increase in viscosity, the steps 104 and 106 may be omitted, along with the high viscosity supply 24 and pump 46. In other embodiments, if the viscous fluid 12 only experiences a reaction resulting in a decrease in viscosity, the steps 108 and 110 may be omitted, along with the low viscosity fluid supply 22 and pump 44.

Following the steps 94 to 110, the height of the viscous fluid 12 in the container 28 may be sensed at step 94.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A viscosity control system for controlling a viscosity of a viscous fluid, the viscosity control system comprising:
   a viscosity sensor unit comprising:
   a container having an inlet and an outlet;

a flow of the viscous fluid flowing into the inlet;
a sensor configured to sense a height of a surface of the viscous fluid in the container, wherein a diameter of the outlet and the flow of the viscous fluid are configured to generate a height of the viscous fluid in the container that is within a predetermined height range;
a supply of viscosity adjusting fluid; and
a controller configured to receive the sensed height, compare the sensed height to the predetermined height range, and modulate a flow of fluid from the supply of viscosity adjusting fluid in response to the sensed height being outside the predetermined height range.

2. The viscosity control system according to claim 1, further comprising a viscosity sensor unit pump configured to provide the flow of the viscous fluid flowing into the inlet.

3. The viscosity control system according to claim 2, wherein the controller is configured to modulate the viscosity sensor unit pump in response to the controller determining the sensed height is above a predetermined maximum height.

4. The viscosity control system according to claim 3, wherein the controller is configured to modulate the viscosity sensor unit pump in response to the controller determining the sensed height is below a predetermined minimum height.

5. The viscosity control system according to claim 1,
wherein the supply of viscosity adjusting fluid comprises a low viscosity fluid supply; and
wherein the controller is configured to modulate a flow of a lower viscosity fluid from the low viscosity fluid supply in response to the sensed height being greater than the predetermined height range.

6. The viscosity control system according to claim 1,
wherein the supply of viscosity adjusting fluid comprises a high viscosity supply; and
wherein the controller is configured to modulate a flow of a higher viscosity agent from the high viscosity supply in response to the sensed height being less than the predetermined height range.

7. The viscosity control system according to claim 1, further comprising a tank of the viscous fluid, the flow of the viscous fluid into the container being drawn from the tank and a flow from the outlet of the container being returned to the tank.

8. The viscosity control system according to claim 7, wherein the tank further include an impeller and motor to mix the viscous fluid.

9. The viscosity control system according to claim 1, wherein the sensor is a laser distance sensor and the sensed height is calculated based on a distance of the sensor from the outlet minus a sensed distance of the surface of the viscous fluid from the sensor.

10. A method of controlling a viscosity of a viscous fluid, the method comprising the steps:

providing a flow of the viscous fluid into a container, the container having an inlet and an outlet, wherein the outlet has a diameter configured to provide an outflow that equilibrates with the flow of the viscous fluid into the container at a predetermined height range in response to the viscosity of the viscous fluid being at a predetermined viscosity;
sensing a height of a surface of the viscous fluid in the container with a sensor;
comparing the sensed height of the surface of the viscous fluid in the container to the predetermined height range with a controller; and
modulating the viscosity of the viscous fluid in response to the sensed height of the surface of the viscous fluid in the container being outside the predetermined height range with the controller.

11. The method according to claim 10, further comprising the step of pumping the viscous fluid with a viscosity sensor unit pump configured to provide the flow of the viscous fluid flowing into the inlet.

12. The method according to claim 11, further comprising the step of modulating the viscosity sensor unit pump to decrease the flow of the viscous fluid in response to the controller determining the sensed height is above a predetermined maximum height.

13. The method according to claim 12, further comprising the step of modulating the viscosity sensor unit pump to increase the flow of the viscous fluid in response to the controller determining the sensed height is below a predetermined minimum height.

14. The method according to claim 10, wherein the controller is independently configured to modulate a flow from a low viscosity fluid supply and a high viscosity supply.

15. The method according to claim 14, further comprising the step of modulating a flow of a lower viscosity fluid from the low viscosity fluid supply in response to the sensed height being greater than the predetermined height range.

16. The method according to claim 14, further comprising the step of modulating a flow of a higher viscosity agent from the high viscosity supply in response to the sensed height being less than the predetermined height range.

17. The method according to claim 10, further comprising the step of drawing the flow of the viscous fluid into the container from a tank of the viscous fluid and returning a flow from the outlet of the container to the tank.

18. The method according to claim 17, further comprising the step of mixing the viscous fluid in the tank with an impeller and motor.

19. The method according to claim 10, further comprising the step of sensing a distance of the surface of the viscous fluid from the sensor with a laser sensor and calculating the sensed height with the controller based on a distance of the sensor from the outlet minus the sensed distance of the surface of the viscous fluid from the sensor.

\* \* \* \* \*